(12) United States Patent
Sakai et al.

(10) Patent No.: US 6,987,226 B2
(45) Date of Patent: Jan. 17, 2006

(54) OCCUPANT WEIGHT DETECTING APPARATUS

(75) Inventors: Morio Sakai, Toyota (JP); Koji Aoki, Nagoya (JP); Masaki Mori, Kariya (JP); Minoru Izawa, Okazaki (JP); Yasunori Hasegawa, Kasugai (JP); Takaaki Enomoto, Anjo (JP)

(73) Assignee: Aisin Seiki Kabushiki Kaisha, Kariya (JP)

( * ) Notice: Subject to any disclaimer, the term of this patent is extended or adjusted under 35 U.S.C. 154(b) by 274 days.

(21) Appl. No.: 10/396,485

(22) Filed: Mar. 26, 2003

(65) Prior Publication Data

US 2003/0213622 A1 Nov. 20, 2003

(30) Foreign Application Priority Data

Mar. 26, 2002 (JP) .................................... 2002-086412
Mar. 13, 2003 (JP) .................................... 2003-068477

(51) Int. Cl.
*B60Q 1/00* (2006.01)
*G01G 23/01* (2006.01)

(52) U.S. Cl. ............... 177/25.13; 177/144; 701/45; 702/101; 73/1.13; 180/273; 280/735

(58) Field of Classification Search ........... 702/101, 702/102; 73/1.13; 180/273; 280/735; 701/45; 177/25.13, 136, 144, 210 R
See application file for complete search history.

(56) References Cited

U.S. PATENT DOCUMENTS

| | | | | |
|---|---|---|---|---|
| 4,751,661 A | * | 6/1988 | Amacher et al. | 702/87 |
| 4,760,539 A | * | 7/1988 | Amacher et al. | 702/101 |
| 5,056,050 A | * | 10/1991 | Fuchs et al. | 702/101 |
| 5,454,591 A | * | 10/1995 | Mazur et al. | 280/735 |
| 6,069,325 A | | 5/2000 | Aoki | 177/136 |
| 6,080,938 A | * | 6/2000 | Lutz | 177/25.15 |
| 6,479,766 B2 | * | 11/2002 | Gray et al. | 177/144 |
| 6,490,515 B1 | | 12/2002 | Okamura et al. | 701/45 |
| 6,502,048 B1 | * | 12/2002 | Lichtinger et al. | 702/101 |
| 6,876,299 B2 | * | 4/2005 | Sakai et al. | 340/436 |

FOREIGN PATENT DOCUMENTS

| | | |
|---|---|---|
| JP | 11-304579 A | 11/1999 |
| JP | 2001-21411 A | 1/2000 |
| JP | 2000-203324 A | 7/2000 |
| JP | 2000-280813 A | 10/2000 |
| JP | 2000-283834 A | 10/2000 |
| JP | 2002-243528 A | 8/2002 |

* cited by examiner

*Primary Examiner*—Randy W. Gibson
(74) *Attorney, Agent, or Firm*—Burns, Doane, Swecker & Mathis LLP

(57) ABSTRACT

An occupant weight detecting apparatus for detecting an occupant weight on a seat includes a load sensor mounted on the seat to detect a load on the seat and output a load signal. A detected load value is calculated periodically based on the load signal and an average is calculated based on the detected load values calculated during a period in which the detected load value is less than a first predetermined. The average of the detected load values is set to a zero point, and the occupant weight is detected based on the detected load value and the zero point when the detected load value exceeds a second predetermined value.

20 Claims, 5 Drawing Sheets

OCCUPANT WEIGHT DETECTING APPARATUS

This application is based on and claims priority under 35 U.S.C. § 119 with respect to Japanese Patent Application 2002-086412 filed on Mar. 26, 2002 and Japanese Patent Application 2003-068477 filed on Mar. 18, 2003, the entire content of both which is incorporated herein by reference.

FIELD OF THE INVENTION

This invention generally relates to a weight detecting apparatus. More particularly, this invention pertains to an occupant weight detecting apparatus for a seat to detect the occupant weight on the seat.

BACKGROUND OF THE INVENTION

An example of a known occupant weight detecting apparatus is disclosed in Japanese Laid-Open Publication No. 11(1999)-304579 published on Nov. 5, 1999. This occupant weight detecting apparatus is provided at the seat of a vehicle in which an airbag is equipped to protect the occupant on the seat. The apparatus is used to detect whether or not an occupant is seated on the seat or to control the gas generation volume for the expansion of the airbag corresponding to the occupant.

The occupant weight detecting apparatus is provided with four load sensors respectively mounted below the four corners of the seat to detect the load of the occupant. Based on the total value of the loads detected by these load sensors, the apparatus determines whether or not the occupant is on the seat or whether the occupant on the seat is an adult or a child. It is thus necessary to accurately detect the load applied on the seat.

Because the weight of the seat is applied to the load sensors, a zero point is provided to detect only the occupant weight. The occupant weight detecting apparatus thus detects an increasing load value from the zero point as the occupant weight.

However, the zero point of the load sensors may shift due to various use conditions of the seat. After a relatively long period of time has passed, a change or changes in the seat and the load sensors may occur. Such relatively long term change may include, by way of example, the distortion of the seat by its stress and the deterioration of the sensors. Due to such relatively long term change, the zero point may become shifted. Further, if the vehicle user places a cushion on the seat, the zero point may be shifted. If a shifting of the zero point occurs, it may be difficult to accurately detect the occupant weight on the seat.

A need exists for an occupant weight detecting apparatus which is not as susceptible to drawbacks such as those mentioned above.

SUMMARY OF THE INVENTION

An occupant weight detecting apparatus for detecting an occupant weight on a seat includes a load sensor mounted on the seat to detect a load on the seat and output a load signal, load calculating means for calculating a detected load value periodically based on the load signal, load average calculating means for calculating an average of the detected load values calculated during a period in which the detected load value is less than a first predetermined value, zero point setting means for setting the average of the detected load values to a zero point, and occupant weight detecting means for detecting the occupant weight based on the detected load value and the zero point when the detected load value exceeds a second predetermined value.

According to another aspect, an occupant weight detecting apparatus for detecting an occupant weight includes a load sensor mounted on the seat to detect a load on the seat and output a load signal, load calculating means for periodically calculating a detected load value based on the load signal, load delaying means for delaying the detected load value so that the delayed load value varies with a time lag following change of the detected load value when the detected load value is less than a first predetermined value, zero point setting means for setting the delayed load value delayed by the load delaying means to a zero point, and occupant weight detecting means for detect the occupant weight based on the detected load value and the zero point when the detected load value exceeds a second predetermined value.

Another aspect involves a, occupant weight detecting apparatus for detecting an occupant weight on a seat that includes a load sensor mounted on the seat to detect a load on the seat and output a load signal, load calculating means for calculating a detected load value periodically based on the load signal, load delaying means for delaying the detected load value so that the delayed load value varies with a time lag following change of the detected load value when no occupant is on the seat, zero point setting means for setting the delayed load value delayed by the load delaying means to a zero point, and occupant weight detecting means for detect the occupant weight based on the detected load value and the zero point when the occupant is on the seat.

BRIEF DESCRIPTION OF THE DRAWING FIGURES

The foregoing and additional features and characteristics of the present invention will become more apparent from the following detailed description considered with reference to the accompanying drawing figures, in which like reference numerals designate like elements.

DETAILED DESCRIPTION

Figure 1:
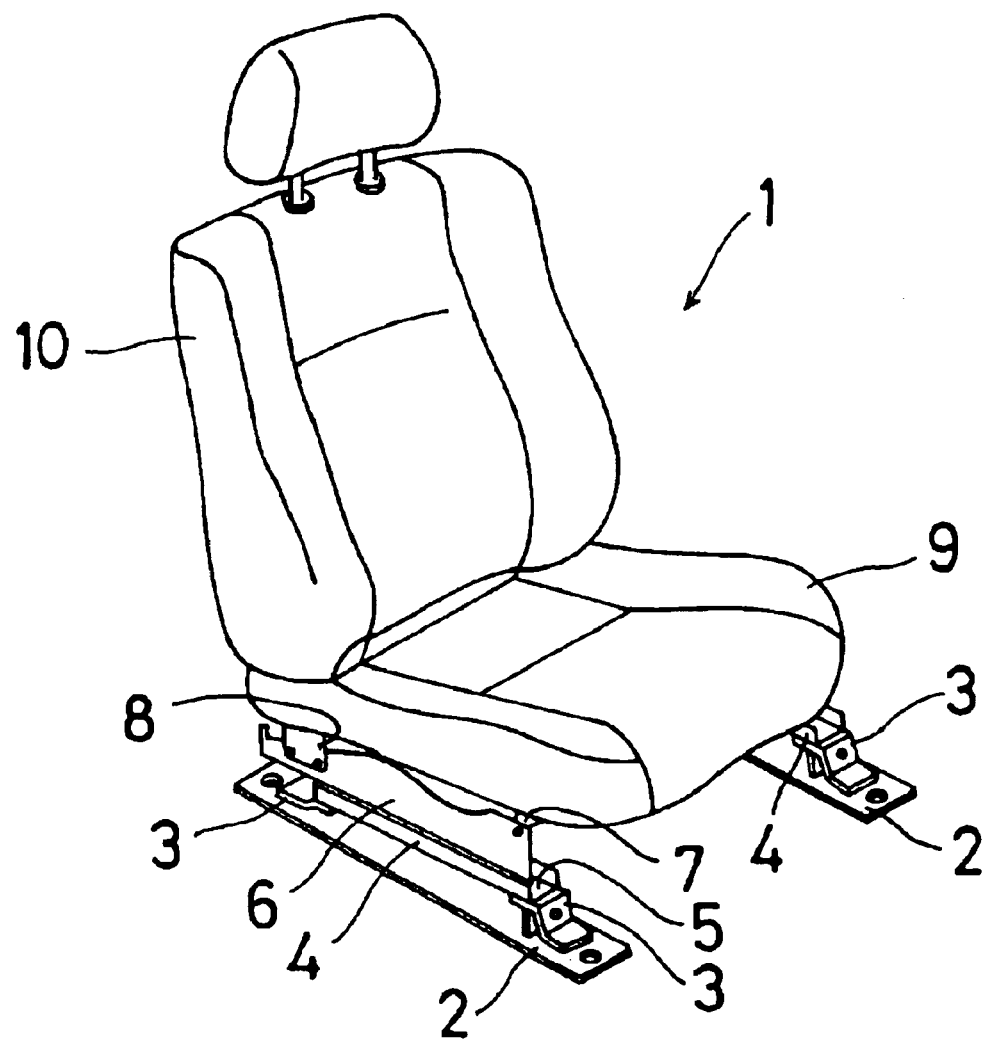
FIG. 1 is a perspective view of a vehicle seat in which the occupant weight detecting apparatus of the present invention can be employed.

FIG. 1 is a perspective view of a seat 1 used as a passenger seat in a vehicle. A pair of spaced apart support frames 2, 2 are fixed to a vehicle floor and are positioned parallel to one another on opposite sides of the seat. Two pairs of brackets 3, 3 are also provided, with each pair of brackets 3, 3 being firmly fixed to the upper face of a respective one of the support frames 2 at the front and rear ends of the support frame. A lower rail 4 is fixed to each pair of brackets 3, 3 on each support frame 2 and extends along each support frame 2. The lower rails 4, 4 have a U-shaped cross-section, with a sliding groove 5 being provided on each lower rail 4. The sliding grooves 5 extend in the front and rear direction of the vehicle (i.e., the vehicle longitudinal direction) and opens upward in a direction away from the support frames 2, 2. In addition, an upper rail 6 is provided at each sliding groove 5 and is slidable along the respective sliding groove 5. Thus, disposed along each side of the seat are a support frame 2, a pair of brackets 3, 3, a lower rail 4, a sliding groove 5 and an upper rail 6.

Figure 2:
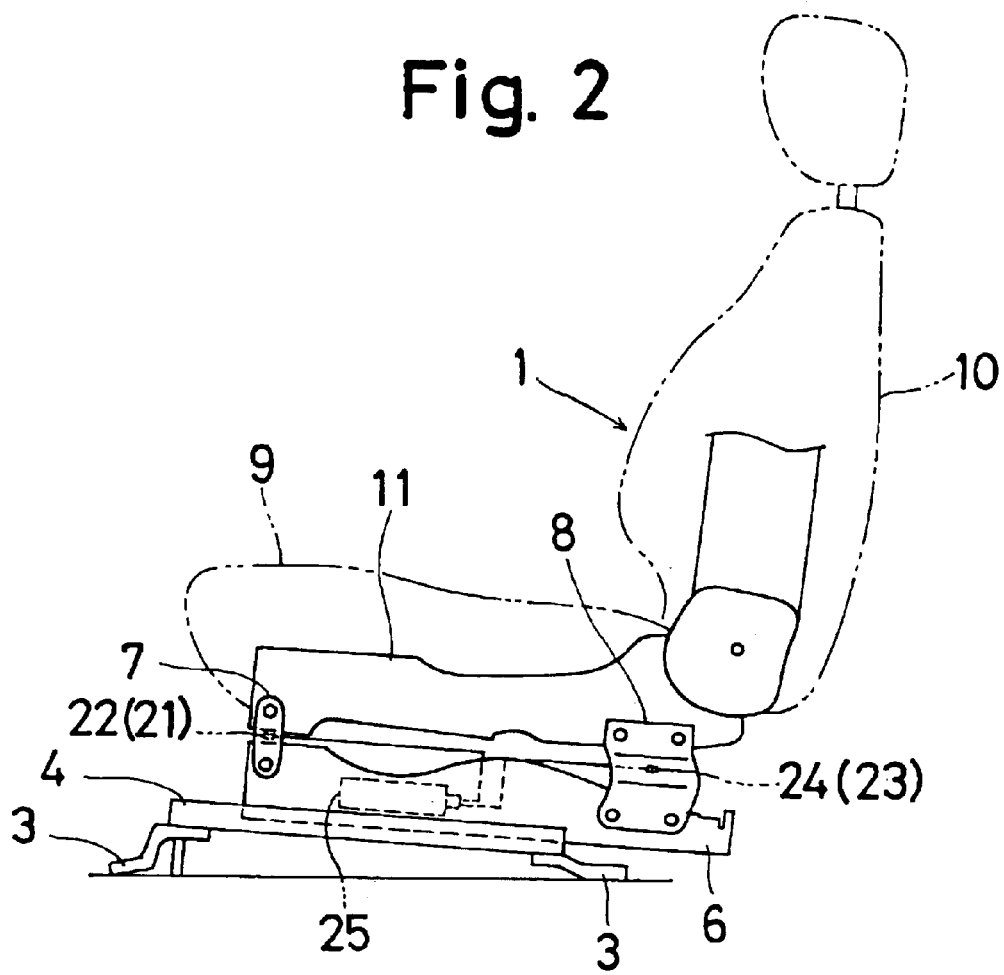
FIG. 2 is a side view of the vehicle seat shown in FIG. 1 illustrating the front-side and rear-side load sensor brackets.

A lower arm 11 is positioned at each side of the seat. As shown in FIG. 2, each lower arm 11 is connected to a respective one of the upper rails 6 through a front-side sensor bracket 7 and a rear-side sensor bracket 8. The lower arms 11 support a seat cushion 9 and a seat back 10.

Figure 3:
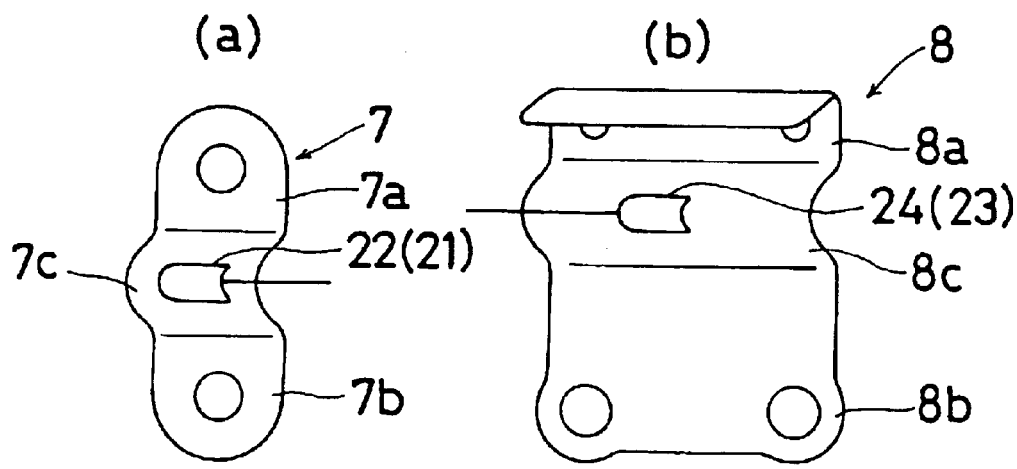
FIG. 3(a) is a front view showing the front-side load sensor bracket depicted in FIG. 2.
FIG. 3(b) is a front view showing the rear-side load sensor bracket depicted in FIG. 2.

As shown in FIG. 3(a), each front-side sensor bracket 7 has an upper connecting portion 7a, a lower connecting portion 7b and a deflecting portion 7c. The upper connecting portion 7a of each front-side sensor bracket 7 is located at the upper end of the front-side sensor bracket 7 and is adapted to be connected to the front portion of the respective lower arm 11. In addition, the lower connecting portion 7b of each front-side sensor bracket 7 is located at the lower end of the front-side sensor bracket 7 and is adapted to be connected to the front portion of the respective upper rail 6. The deflecting portion 7c of each front-side sensor bracket 7 is curved and deflectably located between the upper and lower connecting portions 7a, 7b of the respective front-side sensor bracket 7.

A front right load sensor (first load sensor) 21 is located on the deflecting portion 7c of the front-side sensor bracket 7 located at the right side of the seat while a front left load sensor (second load sensor) 22 is located on the deflecting portion 7c of the front-side sensor bracket 7 located at the left side of the seat. The first and second load sensors 21, 22 include strain detecting elements such as strain gauges to electrically detect the deflecting amount or amount of deflection of the deflecting portions 7c, 7c in response to the load applied to the seat cushion 9.

As shown in FIG. 3(b), each rear-side sensor bracket 8 has an upper connecting portion 8a, a lower connecting portion 8b and a deflecting portion 8c. The upper connecting portion 8a of each rear-side sensor bracket 8 is located at the upper end of the rear-side sensor bracket 8 and is adapted to be connected to the rear portion of one of the lower arms 11. The lower connecting portion 8b of each rear-side sensor bracket 8 is located at the lower end of the rear-side sensor bracket 8 and is adapted to be connected to the rear portion of one of the upper rails 6. The deflecting portion 8c of each rear-side sensor bracket 8 is curved and deflectably located between the upper and lower connecting portions 8a, 8b of the respective rear-side sensor bracket 8.

A rear right load sensor (third load sensor) 23 is located on the deflecting portion 8c of the rear-side sensor bracket 8 at the right side and a rear left load sensor (fourth load sensor) 24 is located on the deflecting portion 8c of the rear-side sensor bracket 8 at the left side. The third and fourth sensors 23, 24 include strain detecting elements such as strain gauges to electrically detect the deflecting amount or amount of deflection of the deflecting portions 8c, 8c in response to the load acting on the seat cushion 9.

Figure 4:
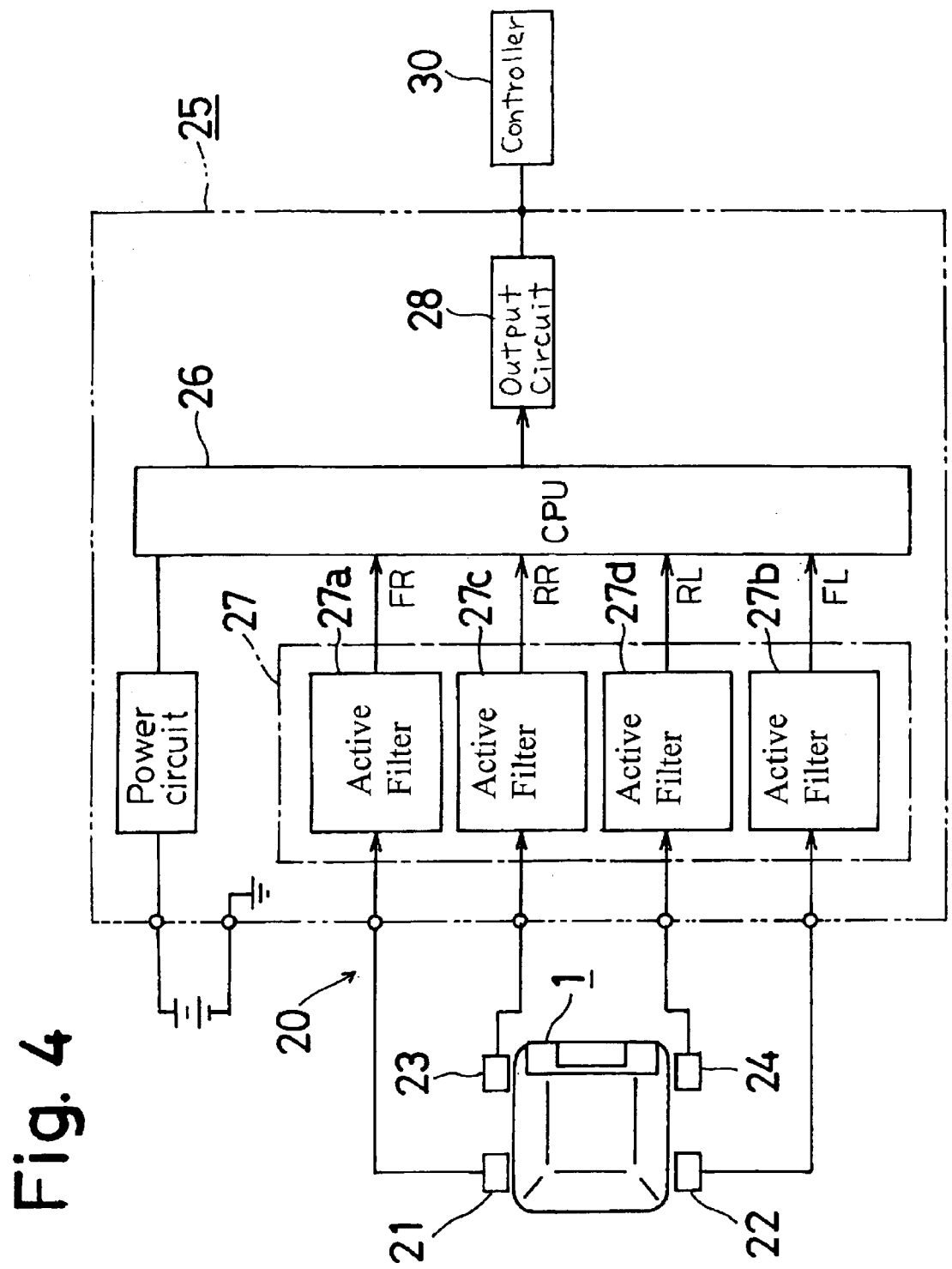
FIG. 4 is a schematic block diagram of the electric structure of the occupant weight detecting apparatus.

The electric structure associated with the occupant weight detecting apparatus 20 is shown in FIG. 4. The occupant weight detecting apparatus 20 includes the first through fourth load sensors 21, 22, 23, 24 and an electric controller 25. The electric controller 25 includes a central processing unit (CPU) 26, a sensor signal input circuit 27 and a determination output circuit 28.

The sensor signal input 27 includes four active filters 27a, 27b, 27c, 27d corresponding respectively to the first through fourth load sensors 21, 22, 23, 24. The respective load signals (voltages) outputted by the load sensors 21, 22, 23, 24 are inputted to the CPU 26 through the respective active filters 27a, 27b, 27c, 27d. Each active filter 27a, 27b, 27c, 27d is a well-known low-pass filter in which passive elements such as capacitors and resistors are combined with active elements such as amplifiers. Each active filter 27a, 27b, 27c, 27d passes only low frequency range load signals from the load signals outputted from each sensor 21, 22, 23, 24 and does not pass other load signals outside the low frequency range. Even if the sensor signal changes due to vehicle vibration during traveling of the vehicle, influence on occupant weight detection can be suppressed or prevented by the active filters 27a, 27b, 27c, 27d. The load signals from the load sensors 21, 22, 23, 24 which pass through the active filters 27a, 27b, 27c, 27d are inputted to the CPU 26 as a first detected value FR, a second detected value FL, a third detected value RR and a fourth detected value RL respectively.

The CPU 26 periodically calculates a detected load value (weight) based on the total of the load signals FR, FL, RR, RL and executes a delay process for delaying the detected load value periodically in such a manner that the delayed load value varies with a time lag behind a change in the detected load value. The CPU 26 sets or updates the delayed load value in the present cycle to a zero point when it is determined that no occupant is seated on the seat 1. When a condition in which the absolute value of the detected load value L is smaller than an occupant detection threshold value WA continues for more than a predetermined period T2, the CPU 26 determines that no occupant is on the seat 1.

In the delay processing, an average value Lav(n) is periodically calculated by weighted averaging of the detected load values L calculated in a period in which it is determined that no occupant is on the seat 1. The average value Lav(n) is calculated by the weighted average within a predetermined period T0 based on the detected load value L(n) in the present cycle and the detected load values L(n−1) . . . L(n−k) (k: a natural number) over the past cycle within the predetermined period T0. That is, the average value Lav(n) is calculated by the following formula:

$$Lav(n)=W(0) \times L(n)+W(1) \times L(n-1)+ \ldots +W(k) \times L(n-k)$$

In the above formula, W is a weighting factor for the respective detected load value L, with the total of all weighting factors being 1. The respective weighting factors may be different or the same. Thus, the zero point is varied gradually by the delay processing even if the present detected load value L(n) varies suddenly.

The CPU 26 further detects the occupant weight on the seat using the above calculated or updated zero point. If the detected load value L exceeds an occupant weight detection threshold value for executing the detection of the occupant weight, the CPU 26 fixes the updated zero point (the zero point in the present cycle) and records it in memory to use for the detection of the occupant weight. In this described embodiment, the occupant weight detection threshold value is equal to the occupant detection threshold value WA. The CPU 26 outputs the result of the occupant weight detection to an electric controller 30 for an airbag device through the output circuit 28 so that the operation of the airbag device is controlled in a desirable manner.

The processing or operation of the CPU, including the occupant weight detection and the zero point correction, is explained below in accordance with the flow chart shown in FIG. 5. This processing or operation is executed or carried out periodically every predetermined time period Ti by interrupt handling.

Figure 5:
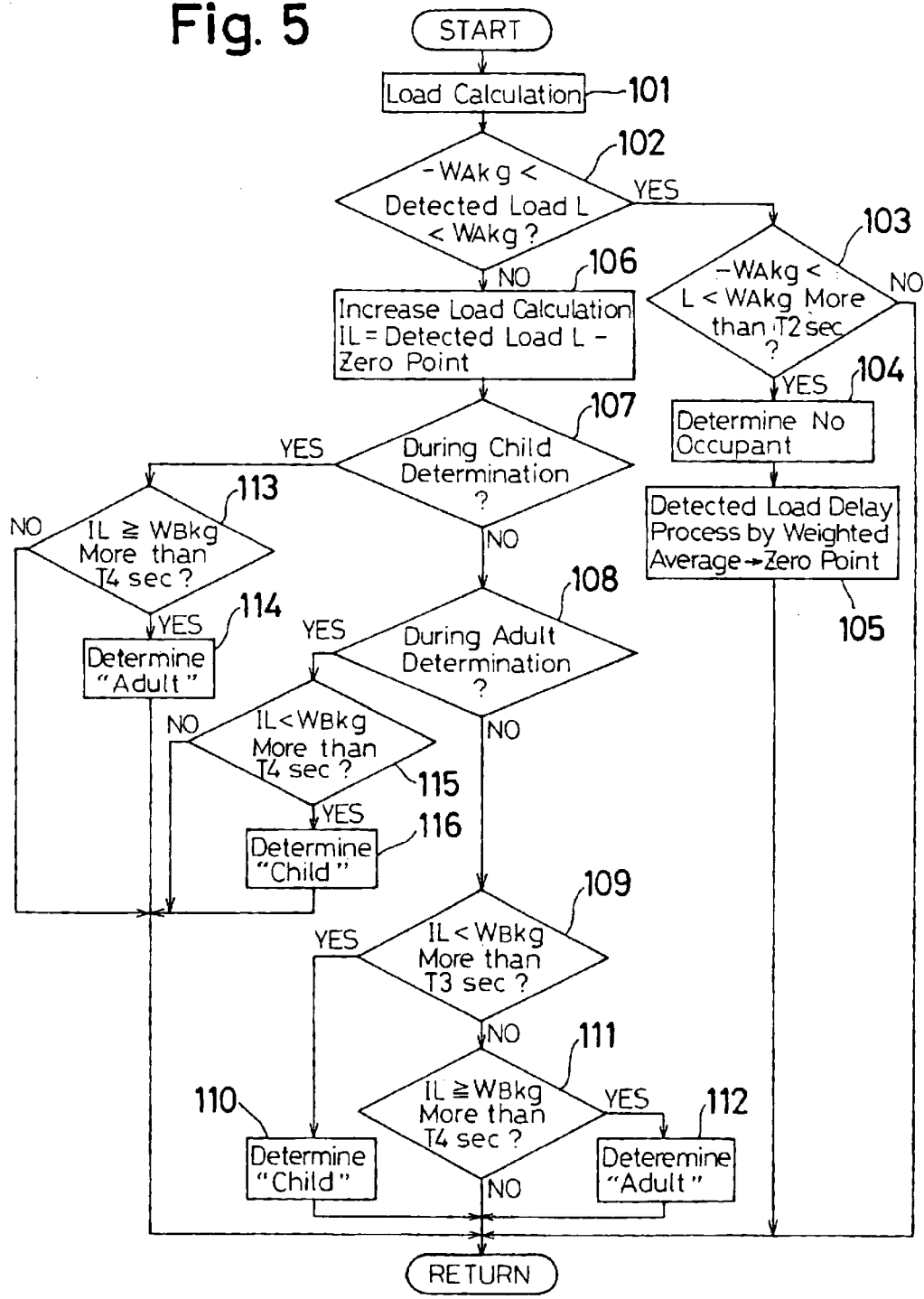
FIG. 5 is a flow chart showing the operational process carried out by the CPU depicted in FIG. 4 during occupant weight detection.

Referring to FIG. 5, initially in Step 101 the CPU 26 reads the load signals FR, FL, RR, RL (voltages) of the load sensors 21, 2, 23, 24 which are filtered by the sensor signal input circuit 27. The CPU 26 converts the load signals FR, FL, RR, RL as voltage into the load values as weights in accordance with a memorized map, and memorizes the load values as weights. Further, the CPU 26 calculates the total value of the four load values and memorizes it as the detected load value L(kg).

Next, in Step 102, the CPU 26 determines whether or not the absolute value of the detected load value L is smaller than the occupant detection threshold value WA. If so, the program proceeds to Step 103 in which the CPU 26 determines if the condition (i.e., the absolute value of the detected load value L being smaller than the occupant detection threshold value WA) continues for more than the period of time T2. The period T2 is longer than the period T1. If the condition does not continue for the period T2, the program is returned.

If it is determined in Step 103 that the condition in which the absolute value of the detected load value L is smaller than the threshold value WA continues for more than the period T2, the CPU 26 determines in Step 104 that no occupant is on the seat. Then, in Step 105, the CPU 26 executes a filtering process of the detected load value L and executes the delay process of the detected load value L using the above weighted average to correct or update the zero point. After that, the process is returned.

If it is determined in Step 102 that the absolute value of the detected load value L is more than the threshold value WA for the occupant weight detection, the program proceeds to Step 106 in which the CPU 26 records the updated zero point in the memory and further calculates the difference between the detected load value L and the updated zero point as an increase amount IL of the detected load, i.e. the occupant weight. The CPU 26 memorizes the calculated load increase amount IL in the memory.

Next, in Step 107, the CPU 26 determines if a child is on the seat. If it is not determined that a child is seated on the seat, the CPU 26 determines in Step 108 if an adult is on the seat. If it is determined in Step 108 that an adult is not on the seat, the program proceeds to Step 109 in which the CPU 26 determines if the load increase amount IL memorized in the memory is smaller than a threshold value for adult determination (hereinafter adult threshold value) WB and if the condition continues for more than a child decision period T3. The child decision period T3 is longer than the period T2. If it is determined that the condition in which the load increase amount IL is smaller than the adult threshold value WB continues for more than the child decision period T3, the program proceeds to Step 110 in which the CPU 26 determines that a child is on the seat and memorizes the result in the memory. Then, the program returns.

In Step 109, if the load increase amount IL is more than the adult threshold value WB or if the condition that the load increase amount IL is smaller than the adult threshold value WB does not continue for more than the child decision period T3, the program proceeds to Step 111. In Step 111, the CPU 26 determines if the load increase amount IL is more than (greater than or equal to) WB and if the condition continues for more than an adult decision period T4. The adult decision period T4 is longer than the child decision period T3. If it is determined in Step 111 that the condition in which the load increase amount IL is more than the adult threshold value WB continues for more than the adult decision period T4, the program proceeds to Step 112 in which the CPU 26 determines that an adult is on the seat and memorizes the result in the memory. Then, the program returns.

In Step 111, if the load increase amount IL is less than the adult threshold value WB or if the condition in which the load increase amount IL is less than the adult threshold value WB does not continue for more than the adult decision period T4, the program returns.

In Step 107, if it is determined that a child is seated on the seat, the CPU 26 determines in Step 113 if the load increase amount IL is more than WB and if such condition continues for more than the adult decision period T4. If it is determined that the condition in which the load increase amount IL is more than the adult threshold value WB continues for more than the adult decision period T4, the program proceeds to Step 114 in which the CPU 26 determines that the adult is on the seat and memorizes the result in the memory. Then, the program returns. In Step 113, if the load increase amount IL is less than the adult threshold value WB or if the condition in which the load increase amount IL is less than the adult threshold value WB does not continue for more than the adult decision period T4, the program returns.

In Step 108, if it is determined that an adult is seated on the seat, the CPU 26 determines in Step 115 if the load increase amount IL is less than WB and if such condition continues for more than the period T4. If it is determined that the condition in which the load increase amount IL is less than the adult threshold value WB continues for more than the period T4, the program proceeds to Step 116 in which the CPU 26 determines that the child is on the seat and memorizes the result in the memory. Then, the program returns. In Step 113, if the load increase amount IL is more than the adult threshold value WB or if the condition in which the load increase amount IL is less than the adult threshold value WB does not continue for more than the period T4, the program returns.

Figure 6:
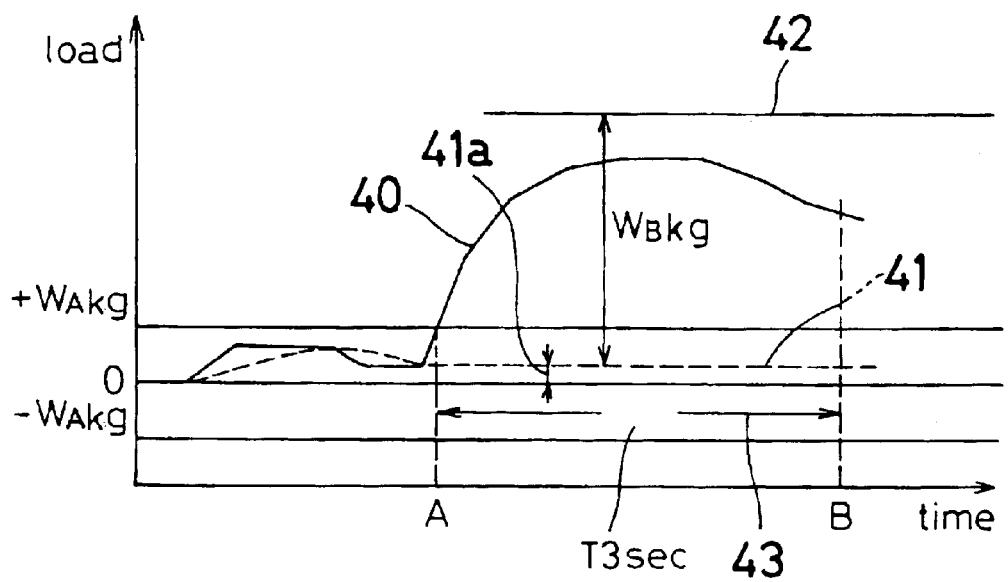
FIG. 6 is a timing chart explaining the occupant determination process corresponding to a change of the detected load.
Figure 7:
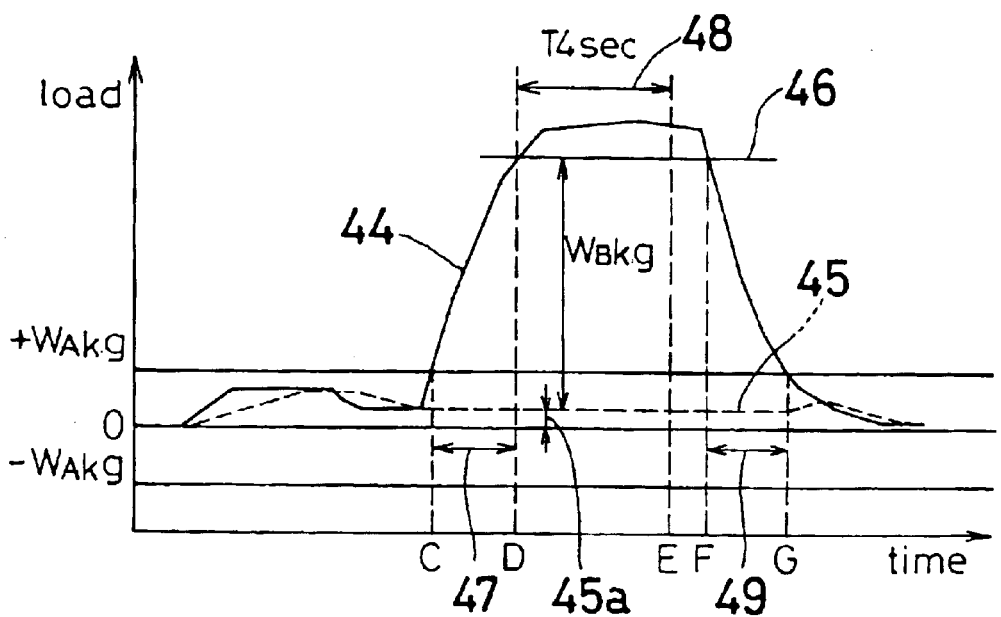
FIG. 7 is another timing chart explaining the occupant determination process corresponding to a change of the detected load.

The timing charts shown in FIGS. 6 and 7 explain the occupant weight detection process corresponding to a change in the detected load value L. The vertical axis (y-axis) of each figure shows the detected load value L and the horizontal axis (x-axis) shows time.

In a situation in which the detected load value L does not exceed an adult determination threshold, the occupant weight detection process is explained in accordance with FIG. 6. Before time A, the detected load value L represented as a curved line 40 is within the range between −WA and +WA (WA: positive value). This means that during this period no occupant is on the seat. In this period, as shown in FIG. 5, the CPU 26 executes the delay process of the detected load value L by the weighted average and calculates the zero point 41 to correct or update it. The zero point 41 is calculated as the average of the detected load value L within the certain period T0 and thus the zero point 41 varies with a time lag behind the change in the detected load value L (i.e., the curved line 40).

When the detected load value L (the curved line 40) exceeds WA at timing A, the zero point 41 is fixed to a constant value which is the zero point updated immediately before the timing A and only the detected load value L (the curved line 40) varies. The difference between the corrected zero point 41 and the original zero point 0 corresponds to a corrected amount 41a for the occupant weight detection. After the zero point 41 is fixed to the constant value, the CPU 26 sets a value in which WB is added to the zero point 41, as the adult determination threshold value 42. The CPU 26 further memorizes the timing A in memory and starts to measure a period between the timing A and the timing B, which corresponds to the child decision period T3.

If the condition in which the detected load value L (the curved line 40) does not exceed the adult determination threshold value 42 continues until the timing B in which the time period T3 has passed from timing A (at the timing B), the CPU 26 determines that the child is on the seat.

In the situation in which the detected load value L exceeds an adult determination threshold, the occupant weight detection process is explained in accordance with FIG. 7. Before timing C, the detected load value L represented as a curved line 44 is within the range between −WA and +WA (WA: positive value). This means that during this period no occupant is on the seat. In this period, the CPU 26 executes the delay process of the detected load value L by the weighted average and calculates the zero point 45 to correct it.

When the detected load value L (the curved line 44) exceeds WA at time C, the zero point 45 is fixed to a constant value which is the zero point updated immediately before the timing C and only the detected load value L (the curved line 44) varies. The difference between the corrected zero point 45 and the original zero point 0 corresponds to a corrected amount 45a for the occupant weight detection. After the zero point 45 is fixed to the constant value, the CPU 26 sets a value in which WB is added to the zero point 45 as the adult determination threshold value 46. The CPU 26 further memorizes the time C in the memory and starts to measure a period 47 between the time C and the time D.

If the detected load value L (the curved line 44) exceeds the adult determination threshold value 46 at time D, the CPU 26 terminates measuring the period 47. The CPU 26 further memorizes the time D in the memory and starts to measure a period 48 between the time D and the time E, which period corresponds to the adult decision period T4. On the contrary, if the condition in which the detected load value L (the curved line 44) does not exceed the adult determination threshold value 46 continues for the child decision period T3 from the time C, the CPU 26 determines that a child is on the seat.

If the period 48 has passed from the time D (at time E), the CPU 26 determines that an adult is on the seat. If the detected load value L (the curved line 44) falls below the adult determination threshold value 46 at time F, the CPU 26 memorizes the time F in the memory and starts to measure a period 49 between the time F and the time G. If the detected load value L (the curved line 44) falls below WA at the time G, the CPU 26 terminates measurement of the period 49 and starts the zero point correction process again. On the contrary, if the condition in which the detected load value L (the curved line 44) exceeds WA continues for the period T4 from the time F, the CPU 26 determines that the child is on the seat.

In this illustrated and described embodiment involving the correction of the zero point, the condition that no occupant is in the seat can be set to a no load condition. Thus, the occupant weight can be detected accurately. Even if the zero point is shifted due to the use condition of the seat, (for example, relatively long term changes in the seat and the load sensors), the occupant weight can be detected accurately by the correction of the zero point. Also, with the load detected value being calculated periodically and the zero point corrected or updated periodically, the zero point can be kept to a relatively accurate value. Additionally, because the zero point is calculated based on the delay processing of the detected load value, the zero point is changed more gradually than the change in the detected load value. As a result, even if the detected load value is changed suddenly due to something being placed on the seat cushion with a thump or something being removed from the seat cushion, the influence to the zero point correction can restrained or prevented. In this case, the zero point can be corrected accurately.

It is to be understood that modifications may be incorporated into the disclosed embodiment. For example, in this disclosed embodiment, the occupant weight detection threshold value is equal to the occupant detection threshold value WA (Step 102 in FIG. 5). However, the occupant weight detection threshold value may be different from the occupant detection threshold value WA.

Also, in the disclosed embodiment, it is determined that the child is on the seat in the period T4 (>T3) after the detected load value L falls below the adult determination threshold value during the adult determination. However, the period for the child determination during the adult determination may be equal to the child decision period T3 when it is determined that the adult is not on the seat.

In the disclosed embodiment, a load threshold for switching from the zero point corrected condition to the zero point fixed condition (no corrected) is equal to a load threshold for switching from the zero point fixed condition to the zero point corrected condition. However, these load thresholds may be different from each other.

The disclosed embodiment also involves determining that no occupant is on the seat when the condition in which the detected load value L is less than the occupant detection threshold value WA continues for more than the period T2. However, it may be determined that no occupant is on the seat when the detected load value L is less than the occupant detection threshold value WA. Further, it may be determined whether an occupant is on the seat based on the output signal of a seat sensor provided in the seat cushion as seen in U.S. Pat. No. 6,490,515.

The principles, preferred embodiments and mode of operation of the present invention have been described in the foregoing specification. However, the invention which is intended to be protected is not to be construed as limited to the particular embodiment disclosed. Further, the embodiment described herein is to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What we claim is:

1. An occupant weight detecting apparatus for detecting an occupant weight on a seat comprising:
    a load sensor mounted on the seat to detect a load on the seat and output a load signal;
    load calculating means for periodically calculating a detected load value based on the load signal;
    determination means for determining if a condition in which the detected load value is less than a first predetermined value continues for a predetermined period;

load average calculating means for calculating an average of a plurality of the detected load values when the determination means determines that the condition in which the detected load value is less than a first predetermined value continues for a predetermined period;

zero point setting means for setting the average of the detected load values to a zero point; and occupant weight detecting means for detecting the occupant weight based on the detected load value and the zero point when the detected load value exceeds a second predetermined value.

2. The occupant weight detecting apparatus according to claim 1, wherein the load average calculating means calculates the average of the detected load values calculated within a predetermined period.

3. The occupant weight detecting apparatus according to claim 1, wherein the load average calculating means calculates the average of the detected load values by weighted averaging.

4. The occupant weight detecting apparatus according to claim 1, wherein the load average calculating means periodically calculates the average of the detected load values to update the average of the detected load values, the zero point setting means updates the zero point in response to the updated average of the detected load values and the occupant weight detecting means calculates a difference between the detected load value and the updated zero point when the detected load value exceeds the second predetermined value.

5. The occupant weight detecting apparatus according to claim 4, wherein the occupant weight detecting means fixes the updated zero point as the zero point for calculating a difference between the detected load value and the updated zero point while the detected load value, exceeds the second predetermined value.

6. The occupant weight detecting apparatus according to claim 1, wherein the first predetermined value is a threshold for determining that no occupant is on the seat.

7. The occupant weight detecting apparatus according to claim 1, wherein the second predetermined value is a threshold for executing detection of the occupant weight.

8. The occupant weight detecting apparatus according to claim 1, wherein the first predetermined value is equal to the second predetermined value.

9. The occupant weight detecting apparatus according to claim 1, wherein the occupant weight detecting means further determines whether the occupant on the seat is an adult or a child.

10. An occupant weight detecting apparatus for detecting an occupant weight on a seat comprising:

a load sensor mounted on the seat to detect a load on the seat and output a load signal;

load calculating means for periodically calculating a detected load value based on the load signal;

load delaying means for delaying the detected load value so that the delayed load value varies with a time lag following change of the detected load value when the detected load value is less than a first predetermined value;

zero point setting means for setting the delayed load value delayed by the load delaying means to a zero point; and occupant weight detecting means for detect the occupant weight based on the detected load value and the zero point when the detected load value exceeds a second predetermined value.

11. The occupant weight detecting apparatus according to claim 10, wherein the load delaying means delays the detected load value based on the detected load value calculated in a current cycle and at least one detected load value calculated in a previous cycle while the detected load value is less than the first predetermined value.

12. The occupant weight detecting apparatus according to claim 11, wherein the load delaying means delays the detected load value by averaging the detected load value calculated in the current cycle and the at least one detected load value calculated in the previous cycle.

13. The occupant weight detecting apparatus according to claim 12, wherein the load delaying means averages the detected load value in the current cycle and the at least one detected load value in the previous cycle by weighted averaging.

14. The occupant weight detecting apparatus according to claim 10, wherein the load delaying means delays the detected load value periodically to update the delayed load value, the zero point setting means updates the zero point in response to the delayed load value updated by the load delaying means and the occupant weight detecting means calculates a difference between the detected load value and the updated zero point when the detected load value exceeds the second predetermined value.

15. The occupant weight detecting apparatus according to claim 10, wherein the first predetermined value is a threshold for determining that no occupant is on the seat and the second predetermined value is a threshold for executing the detection of the occupant weight.

16. An occupant weight detecting apparatus for detecting an occupant weight on a seat comprising:

a load sensor mounted on the seat to detect a load on the seat and output a load signal;

load calculating means for calculating a detected load value periodically based on the load signal;

load delaying means for delaying the detected load value so that the delayed load value varies with a time lag following change of the detected load value when no occupant is on the seat;

zero point setting means for setting the delayed load value delayed by the load delaying means to a zero point; and occupant weight detecting means for detect the occupant weight based on the detected load value and the zero point when the occupant is on the seat.

17. The occupant weight detecting apparatus according to claim 16, wherein the load delaying means delays the detected load value by averaging the detected load value calculated in a current cycle and at least one detected load value calculated in a previous cycle while no occupant is on the seat.

18. The occupant weight detecting apparatus according to claim 16, further comprising occupant determining means for determining that no occupant is on the seat based on the detected load value.

19. The occupant weight detecting apparatus according to claim 18, wherein the occupant determining means determines that no occupant is on the seat when a condition in which the detected load value is less than a predetermined value continues for a predetermined period.

20. The occupant weight detecting apparatus according to claim 1, wherein a plurality of the load sensors is mounted on the seat to output load signals respectively, the load calculating means periodically calculates the single detected load value based on the load signals of the load sensors and all of the determination means, the load average calculating means, the zero point setting means and the occupant weight detecting means use the detected load value calculated by the load calculating means.

* * * * *